United States Patent
Ichikawa

(10) Patent No.: US 9,488,258 B2
(45) Date of Patent: Nov. 8, 2016

(54) VEHICLE POWER TRANSMISSION DEVICE

(71) Applicant: HONDA MOTOR CO., LTD., Tokyo (JP)

(72) Inventor: Kazuki Ichikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 14/442,602

(22) PCT Filed: Nov. 8, 2013

(86) PCT No.: PCT/JP2013/080215
§ 371 (c)(1),
(2) Date: May 13, 2015

(87) PCT Pub. No.: WO2014/087794
PCT Pub. Date: Jun. 12, 2014

(65) Prior Publication Data
US 2016/0273634 A1    Sep. 22, 2016

(30) Foreign Application Priority Data
Dec. 4, 2012  (JP) .................................. 2012-265216

(51) Int. Cl.
*F16H 29/04*  (2006.01)
*B60K 17/08*  (2006.01)
(Continued)

(52) U.S. Cl.
CPC ............... *F16H 29/04* (2013.01); *B60K 17/08* (2013.01); *B60K 17/165* (2013.01); *B60K 17/26* (2013.01); *B60K 17/28* (2013.01)

(58) Field of Classification Search
CPC ..... F16H 29/04; B60K 17/165; B60K 17/28; B60K 17/08; B60K 17/26
See application file for complete search history.

(56) References Cited

U.S. PATENT DOCUMENTS 1,557,432 A    10/1925  Defordt
1,945,702 A    2/1934   Pitter
(Continued)

FOREIGN PATENT DOCUMENTS

GB    2 180 020 A    3/1987
JP    62-56661 A     3/1987
(Continued)

OTHER PUBLICATIONS

International Search Report dated Feb. 10, 2014 issued in corresponding Application No. PCT/JP2013/080900.
(Continued)

*Primary Examiner* — Drew Brown
(74) *Attorney, Agent, or Firm* — Westerman, Hattori, Daniels & Adrian, LLP

(57) ABSTRACT

A vehicle power transmission device including a crank type continuously variable transmission mechanism is provided with a forward/reverse switching mechanism disposed between an output shaft and a driven wheel, a transmission shaft relatively rotatably fitted around an outer periphery of the output shaft, an auxiliary power transmission device configured to provide a connection between an input shaft and the transmission shaft, a first outer peripheral spline provided on the transmission shaft, second and third outer peripheral splines provided on the output shaft, an inner peripheral spline that can switch between a first state, a second state, and a third state, and a second one-way clutch provided between the output shaft and the second outer peripheral spline and that is engaged when a rotational speed of the output shaft exceeds a rotational speed of the second outer peripheral spline.

4 Claims, 16 Drawing Sheets

(51) Int. Cl.
*B60K 17/16* (2006.01)
*B60K 17/28* (2006.01)
*B60K 17/26* (2006.01)

(56) References Cited

U.S. PATENT DOCUMENTS

| | | | |
|---|---|---|---|
| 7,108,626 B2 * | 9/2006 | Friedmann | B60K 6/36 475/8 |
| 8,449,426 B2 * | 5/2013 | Nishimura | B60K 6/48 475/162 |
| 8,602,936 B2 * | 12/2013 | Ichikawa | B60K 6/442 475/162 |
| 8,911,325 B2 * | 12/2014 | Sasaki | B60W 20/19 475/170 |
| 8,915,822 B2 * | 12/2014 | Ichikawa | B60K 5/08 475/170 |
| 9,382,985 B2 * | 7/2016 | Nishimura | F16H 29/04 |
| 2005/0039572 A1 | 2/2005 | Friedmann | |

FOREIGN PATENT DOCUMENTS

| | | |
|---|---|---|
| JP | 62-075174 A | 4/1987 |
| JP | 2005-502543 A | 1/2005 |
| JP | 2010-025310 A | 2/2010 |
| JP | 2012-001048 A | 1/2012 |
| JP | 2012-21592 A | 2/2012 |
| JP | 2012-506003 A | 3/2012 |

OTHER PUBLICATIONS

International Search Report dated Feb. 10, 2014, issued in corresponding application PCT/JP2013/080215.

* cited by examiner

TOP STATE

LOW STATE

FIG.8

|  | FIRST MESHING SWITCHING MECHANISM | SECOND MESHING SWITCHING MECHANISM |
|---|---|---|
| PARKING RANGE | L | R |
| REVERSE RANGE | R | R |
| NEUTRAL RANGE | R | L |
| DRIVE RANGE | L | L |

PARKING RANGE

FIG.11 NEUTRAL RANGE

DRIVE RANGE
NORMAL TRAVEL STATE

DRIVE RANGE
ENGINE BRAKING STATE

FIG.15 DRIVE RANGE FAIL STATE

VEHICLE POWER TRANSMISSION DEVICE

TECHNICAL FIELD

The present invention relates to a vehicle power transmission device that includes a crank type continuously variable transmission mechanism.

BACKGROUND ART

A continuously variable transmission that includes a plurality of crank type transmission units that convert rotation of an input shaft connected to an engine into back and forth movement of a connecting rod and convert back and forth movement of the connecting rod into rotation of an output shaft by means of a one-way clutch, wherein a motor/generator disposed on the input shaft is connected to the output shaft without going through the crank type transmission unit, thus transmitting back a driving force from the output shaft side to the motor/generator and thereby generating a regenerative braking force corresponding to engine braking, is known from Patent Document 1 below.

Furthermore, a continuously variable transmission equipped with such a crank type transmission unit, wherein a motor/generator is connected to a differential gear, an engine crankshaft is connected to the differential gear via a clutch, and a vehicle is made to travel in reverse by means of the driving force of the motor/generator, or the engine is cranked and started by the driving force of the motor/generator, is known from Patent Document 2 below.

RELATED ART DOCUMENTS

Patent Documents

Patent Document 1: Japanese Patent Publication No. 2005-502543
Patent Document 2: Japanese Patent Application Laid-open No. 2012-1048

SUMMARY OF THE INVENTION

Problems to be Solved by the Invention

In the arrangement described in Patent Document 1 above, a regenerative braking force corresponding to engine braking can be generated using the motor/generator when the vehicle decelerates, but since the motor/generator is disposed on the axis of the input shaft, there is the problem that the axial dimension of the power transmission device increases.

Furthermore, in the arrangement described in Patent Document 2 above, engine braking can be effected by transmitting a driving force, which has been inputted from a driven wheel to the differential gear, back to the engine via the clutch when the vehicle decelerates, but since the engine cannot rotate in reverse, there is the problem that engine braking cannot be used when the vehicle travels in reverse.

The present invention has been accomplished in light of the above circumstances, and it is an object thereof to provide a vehicle power transmission device, equipped with a crank type continuously variable transmission mechanism, that enables engine braking to be used while avoiding any increase in the axial dimension of the power transmission device.

Means for Solving the Problems

In order to attain the above object, according to a first aspect of the present invention, there is provided a vehicle power transmission device comprising an input shaft connected to an engine, an output shaft connected to a driven wheel, an input side fulcrum having a variable amount of eccentricity from an axis of the input shaft and rotating together with the input shaft, a first one-way clutch connected to the output shaft, an output side fulcrum provided on an input member of the first one-way clutch, a connecting rod having opposite ends thereof connected to the input side fulcrum and the output side fulcrum and moving back and forth, and a shift actuator for changing the amount of eccentricity of the input side fulcrum, wherein the vehicle power transmission device comprises a forward/reverse switching mechanism disposed between the output shaft and the driven wheel, a transmission shaft relatively rotatably fitted around an outer periphery of the output shaft, auxiliary power transmission means providing a connection between the input shaft and the transmission shaft, a first outer peripheral spline provided on the transmission shaft, a second outer peripheral spline and a third outer peripheral spline provided on the output shaft, an inner peripheral spline that can switch between a first state in which the inner peripheral spline meshes with the first and second outer peripheral splines, a second state in which the inner peripheral spline meshes with the second and third outer peripheral splines, and a third state in which the inner peripheral spline meshes with the first to third outer peripheral splines, and a second one-way clutch that is provided between the output shaft and the second outer peripheral spline and that is engaged when a rotational speed of the output shaft exceeds a rotational speed of the second outer peripheral spline.

Further, according to a second aspect of the present invention, in addition to the first aspect, the input shaft side of the auxiliary power transmission means is disposed further on the engine side than the input side fulcrum and the transmission shaft side is disposed further on the forward/reverse switching mechanism side than the output side fulcrum.

Furthermore, according to a third aspect of the present invention, there is provided a vehicle power transmission device comprising an input shaft connected to an engine, an output shaft connected to a driven wheel, an input side fulcrum having a variable amount of eccentricity from an axis of the input shaft and rotating together with the input shaft, a first one-way clutch connected to the output shaft, an output side fulcrum provided on an input member of the first one-way clutch, a connecting rod having opposite ends thereof connected to the input side fulcrum and the output side fulcrum and moving back and forth, and a shift actuator for changing the amount of eccentricity of the input side fulcrum, wherein the vehicle power transmission device comprises a forward/reverse switching mechanism disposed between the output shaft and the driven wheel, a transmission shaft relatively rotatably fitted around an outer periphery of the input shaft, auxiliary power transmission means providing a connection between the transmission shaft and the output shaft, a first outer peripheral spline provided on the input shaft, a second outer peripheral spline and a third outer peripheral spline provided on the transmission shaft, an inner peripheral spline that can switch between a first state in which the inner peripheral spline meshes with the first and second outer peripheral splines, a second state in which the inner peripheral spline meshes with the second and third outer peripheral splines, and a third state in which the inner peripheral spline meshes with the first to third outer peripheral splines, and a second one-way clutch that is provided between the transmission shaft and the second outer peripheral spline and that is engaged when a rotational speed of the transmission shaft exceeds a rotational speed of the second outer peripheral spline.

Moreover, according to a fourth aspect of the present invention, in addition to the third aspect, the transmission shaft side of the auxiliary power transmission means is disposed further on the engine side than the input side fulcrum and the output shaft side is disposed further on the forward/reverse switching mechanism side than the output side fulcrum.

A first output shaft 12 of an embodiment corresponds to the output shaft of the present invention, an eccentric disk 18 of the embodiment corresponds to the input side fulcrum of the present invention, a pin 19c of the embodiment corresponds to the output side fulcrum of the present invention, an outer member 22 of the embodiment corresponds to the input member of the one-way clutch of the present invention, and a first power transmission switching mechanism S1 of the embodiment corresponds to the forward/reverse switching mechanism of the present invention.

Effects of the Invention

In accordance with the first aspect of the present invention, when the input shaft is rotated by means of the engine, the input side fulcrum rotates eccentrically, when the connecting rod having one end connected to the input side fulcrum moves back and forth, the output side fulcrum connected to the other end of the connecting rod moves back and forth, and the output shaft thus rotates intermittently via the first one-way clutch; rotation of the input shaft is changed in speed at a gear ratio corresponding to the amount of eccentricity of the input side fulcrum and is transmitted to the output shaft. By transmitting rotation of the output shaft to the driven wheel as forward rotation or reverse rotation by means of the forward/reverse switching mechanism the vehicle is made to travel forward or in reverse.

When the vehicle travels forward or in reverse in a normal state, since the first outer peripheral spline of the transmission shaft and the second outer peripheral spline of the output shaft are joined by means of the inner peripheral spline, the engine driving force is transmitted to the second one-way clutch via the auxiliary power transmission means, the transmission shaft, and the second outer peripheral spline; since the rotational speed of the output shaft is lower than the rotational speed of the second outer peripheral spline (the rotational speed of the transmission shaft), the second one-way clutch is not engaged, and the vehicle is made to travel forward or in reverse via the crank type continuously variable transmission mechanism.

When the vehicle decelerates in this state, the driving force is transmitted from the driven wheel back to the output shaft, but since the rotational speed of the output shaft exceeds the rotational speed of the second outer peripheral spline, the second one-way clutch is engaged, and the driving force of the output shaft is transmitted back to the engine via the auxiliary power transmission means, thus effecting engine braking.

When the vehicle decelerates further, since the second outer peripheral spline and the third outer peripheral spline of the output shaft are joined by means of the inner peripheral spline, the transmission shaft is detached from the output shaft, the driving force is not transmitted back to the engine, and deceleration idling stop in which the engine stops before the vehicle stops is enabled.

When there is a failure of the crank type continuously variable transmission mechanism, the first outer peripheral spline of the transmission shaft and the second and third outer peripheral splines of the output shaft are joined by means of the inner peripheral spline, the driving force of the engine is transmitted directly to the output shaft via the auxiliary power transmission means, the transmission shaft, and the third outer peripheral spline, and the vehicle is made to travel forward or in reverse without going through the crank type continuously variable transmission mechanism.

Therefore, engine braking is enabled both when traveling forward and when traveling in reverse while enabling the vehicle to travel forward and in reverse without using an electric motor, which would increase the axial dimension of the vehicle power transmission device.

Furthermore, the vehicle power transmission device tends to increase the axial dimension on the input shaft side, to which the engine is connected, but providing the transmission shaft on the output shaft side enables any increase in the axial dimension on the input shaft side to be suppressed, thus minimizing the overall axial dimension of the vehicle power transmission device.

Furthermore, in accordance with the second aspect of the present invention, since the input shaft side of the auxiliary power transmission means is disposed further on the engine side than the input side fulcrum and the transmission shaft side is disposed further on the forward/reverse switching mechanism side than the output side fulcrum, when there is a failure of the crank type continuously variable transmission mechanism, the driving force of the engine can be transmitted to the output shaft without going through the crank type continuously variable transmission mechanism, thus making it possible to avoid worsening the damage to the crank type continuously variable transmission mechanism that has failed.

Moreover, in accordance with the third aspect of the present invention, when the input shaft is rotated by the engine, the input side fulcrum rotates eccentrically, the connecting rod having one end connected to the input side fulcrum moves back and forth, the output side fulcrum connected to the other end of the connecting rod moves back and forth, the output shaft thus rotates intermittently via the first one-way clutch, and rotation of the input shaft is therefore changed in speed at a gear ratio according to the amount of eccentricity of the input side fulcrum and transmitted to the output shaft. By making the output shaft rotate forward or in reverse by means of the forward/reverse switching mechanism and transmitting the rotation to the driven wheel the vehicle is made to travel forward or in reverse.

When the vehicle is traveling forward or in reverse in a normal state, the first outer peripheral spline of the input shaft and the second outer peripheral spline of the transmission shaft are joined by means of the inner peripheral spline, and the driving force of the engine is transmitted to the second one-way clutch via the first outer peripheral spline and the second outer peripheral spline, but since the rotational speed of the transmission shaft is lower than the rotational speed of the second outer peripheral spline (the rotational speed of the input shaft), the second one-way clutch is not engaged, and the vehicle is made to travel forward or in reverse via the crank type continuously variable transmission mechanism.

When in this state the vehicle decelerates, the driving force is transmitted from the driven wheel back to the transmission shaft via the auxiliary power transmission means, but since the rotational speed of the transmission shaft exceeds the rotational speed of the second outer peripheral spline, the second one-way clutch is engaged, and the driving force of the transmission shaft is transmitted back to the engine, thus effecting engine braking.

When the vehicle decelerates further, since the second outer peripheral spline and the third outer peripheral spline of the transmission shaft are joined by means of the inner peripheral spline, the transmission shaft is detached from the input shaft, the driving force is not transmitted back to the engine, and it becomes possible to effect deceleration idling stop in which the engine stops before the vehicle stops.

Since, when there is a failure of the crank type continuously variable transmission mechanism, the first outer peripheral spline of the input shaft and the second and third outer peripheral splines of the transmission shaft are joined by the inner peripheral spline, the driving force of the engine is transmitted directly to the output shaft via the third outer peripheral spline, the transmission shaft, and the auxiliary power transmission means, and the vehicle is made to travel forward or in reverse without going through the crank type continuously variable transmission mechanism.

Therefore, the vehicle can travel forward and in reverse without requiring an electric motor, which would increase the axial dimension of the vehicle power transmission device, and engine braking is also enabled both when the vehicle travels forward and when it travels in reverse.

Furthermore, in accordance with the fourth aspect of the present invention, since the transmission shaft side of the auxiliary power transmission means is disposed further on the engine side than the input side fulcrum and the output shaft side is disposed further on the forward/reverse switching mechanism side than the output side fulcrum, when there is a failure of the crank type continuously variable transmission mechanism, the driving force of the engine can be transmitted to the output shaft without going through the crank type continuously variable transmission mechanism, thus making it possible to avoid worsening the damage to the crank type continuously variable transmission mechanism that has failed.

BRIEF DESCRIPTION OF DRAWINGS

FIG. 8 is a table for engagement of first and second meshing switching mechanisms. (first embodiment)

EXPLANATION OF REFERENCE NUMERALS AND SYMBOLS

Figure 1:
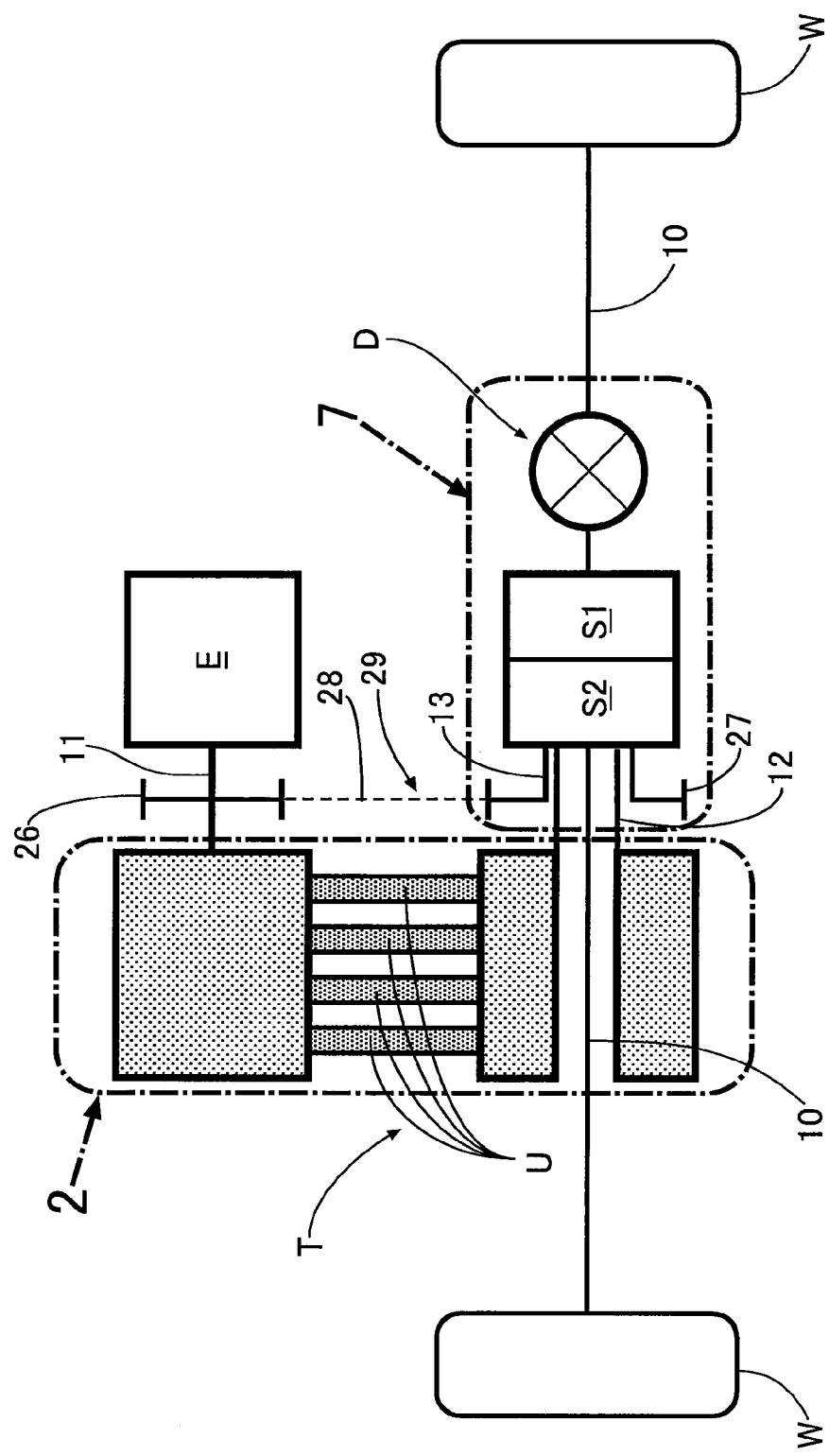
FIG. 1 is a skeleton diagram of a vehicle power transmission device. (first embodiment)

11 Input shaft
11a First outer peripheral spline
12 First output shaft (output shaft)
12b Second outer peripheral spline
12c Third outer peripheral spline
13 Transmission shaft
13a First outer peripheral spline
14 Shift actuator
18 Eccentric disk (input side fulcrum)
19 Connecting rod
19c Pin (output side fulcrum)
21 First one-way clutch
22 Outer member (input member)
29 Auxiliary power transmission means
41a First inner peripheral spline (inner peripheral spline)
45 Second one-way clutch
E Engine
S1 First power transmission switching mechanism (forward/reverse switching mechanism)
W Driven wheel Modes For Carrying Out The Invention A first embodiment of the present invention is explained by reference to FIG. 1 to FIG. 15.

First Embodiment

As shown in FIG. 1, a vehicle power transmission device for transmitting the driving force of an engine E to driven wheels W and W via left and right axles 10 and 10 includes a continuously variable transmission T, a first power transmission switching mechanism S1, a second power transmission switching mechanism S2, and a differential gear D. The first power transmission switching mechanism S1 can switch between a parking range, a reverse range, a neutral range, and a drive range. The second power transmission switching mechanism S2 can switch between a normal travel/engine braking state, an idling stop state, and a fail state.

The structure of the vehicle power transmission device is now explained by reference to FIGS. 2 to 7.

Figure 2:
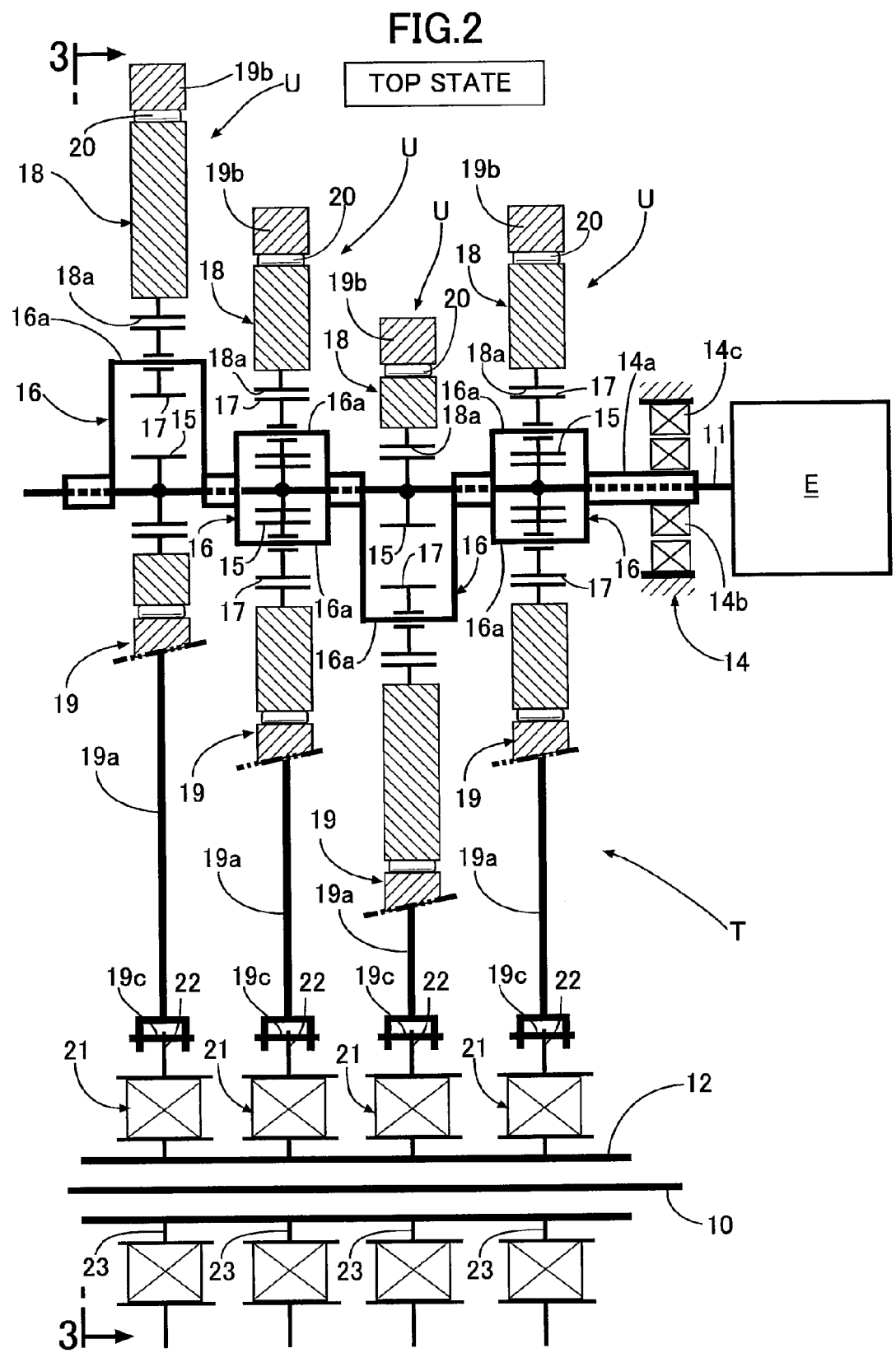
FIG. 2 is a detailed diagram of part 2 in FIG. 1. (first embodiment)
Figure 3:
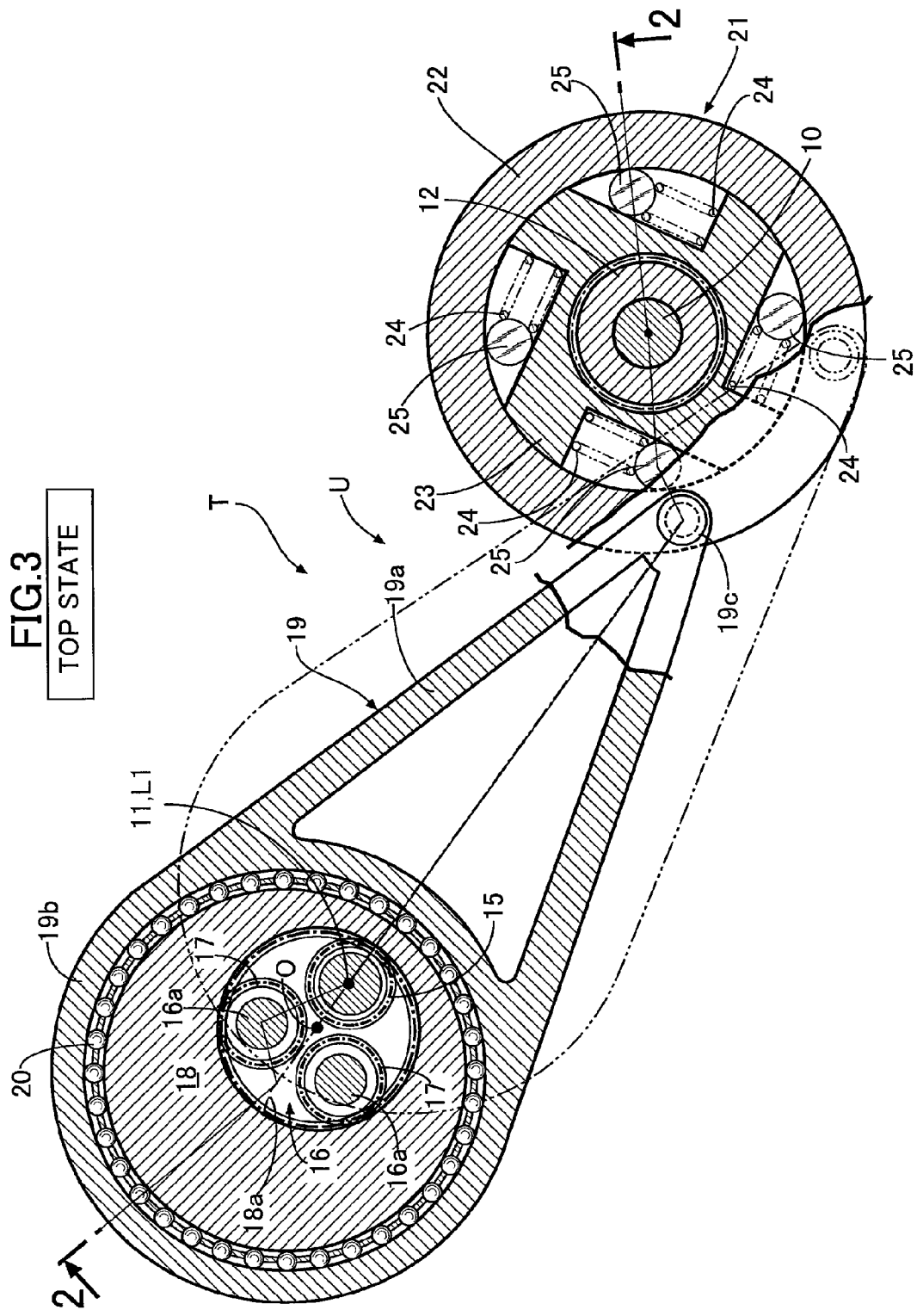
FIG. 3 is a sectional view (TOP state) along line 3-3 in FIG. 2. (first embodiment)

As shown in FIG. 2 and FIG. 3, the continuously variable transmission T of the present embodiment has a plurality (four in the embodiment) of transmission units U having the same structure superimposed on one another in the axial direction; these transmission units U include a common input shaft 11 and a common first output shaft 12 disposed in parallel to each other, and rotation of the input shaft 11 is reduced in speed or increased in speed and transmitted to the first output shaft 12.

The structure of one transmission unit U is explained below as being representative thereof. The input shaft 11, which is connected to the engine E and rotates, extends relatively rotatably through the interior of a hollow rotating shaft 14a of a shift actuator 14 such as an electric motor. A rotor 14b of the shift actuator 14 is fixed to the rotating shaft 14a, and a stator 14c is fixed to a casing. The rotating shaft 14a of the shift actuator 14 can rotate at the same speed as that of the input shaft 11 and can rotate at a different speed relative to the input shaft 11.

A first pinion 15 is fixed to the input shaft 11, which extends through the rotating shaft 14a of the shift actuator 14, and a crank-shaped carrier 16 is connected to the rotating shaft 14a of the shift actuator 14 so as to straddle the first pinion 15. Two second pinions 17 and 17 having the same diameter as that of the first pinion 15 are each supported via pinion pins 16a and 16a at positions forming an equilateral triangle in cooperation with the first pinion 15, and a ring gear 18a eccentrically formed in the interior of a circular plate-shaped eccentric disk 18 meshes with the first pinion 15 and the second pinions 17 and 17. A ring portion 19b provided at one end of a rod portion 19a of a connecting rod 19 is relatively rotatably fitted onto an outer peripheral face of the eccentric disk 18 via a ball bearing 20.

A first one-way clutch 21 provided on the outer periphery of the first output shaft 12 includes a ring-shaped outer member 22 pivotably supported on the rod portion 19a of the connecting rod 19 via a pin 19c, an inner member 23 disposed in the interior of the outer member 22 and fixed to the first output shaft 12, and rollers 25 disposed in a wedge-shaped space formed between an arc face on the inner periphery of the outer member 22 and a flat plane on the outer periphery of the inner member 23 and urged by means of springs 24.

As is clear from FIG. 2, the four transmission units U share the crank-shaped carrier 16, but the phase of each eccentric disk 18 supported on the carrier 16 via the second pinions 17 and 17 is different by 90° for each transmission unit U. For example, in FIG. 2, the eccentric disk 18 of the transmission unit U at the left-hand end is displaced upward relative to the input shaft 11 in the drawing, the eccentric disk 18 of the transmission unit U third from the left is displaced downward relative to the input shaft 11 in the drawing, and the eccentric disks 18 and 18 of the transmission units U and U second and fourth from the left are positioned in the middle in the vertical direction.

As is clear from FIG. 1, the continuously variable transmission T includes an auxiliary power transmission path that can transmit a driving force via a separate path from that by the six transmission units U. That is, a first sprocket 26 provided on the input shaft 11 on the upstream side (engine E side) of the transmission units U and a second sprocket 27 provided on a transmission shaft 13 relatively rotatably fitted on the outer periphery of the first output shaft 12 on the downstream side (differential gear D) side of the transmission units U are connected by an endless chain 28; the first sprocket 26, the second sprocket 27, and the endless chain 28 form auxiliary power transmission means 29.

Figure 7:
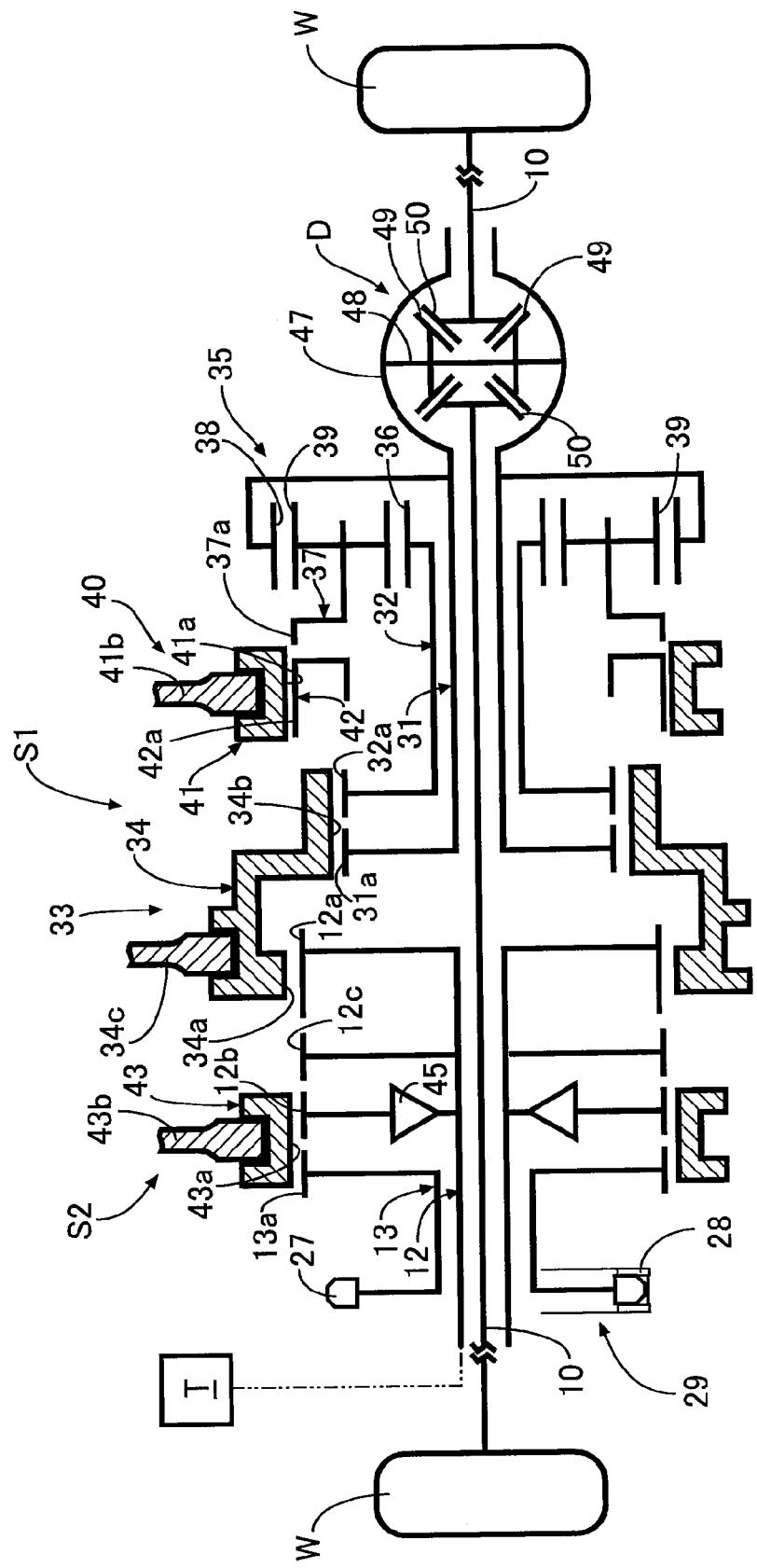
FIG. 7 is a detailed diagram of part 7 in FIG. 1. (first embodiment)

As is clear from FIG. 7, the first power transmission switching mechanism S1 includes, in addition to the tubular first output shaft 12 relatively rotatably fitted onto the outer periphery of the axle 10, a tubular second output shaft 31 relatively rotatably fitted onto the outer periphery of the axle 10 and a tubular third output shaft 32 relatively rotatably fitted onto the outer periphery of the second output shaft 31. A fourth outer peripheral spline 12a is formed on the right end of the first output shaft 12, a fifth outer peripheral spline 31a is formed on the left end of the second output shaft 31, and a sixth outer peripheral spline 32a is formed on the left end of the third output shaft 32.

The fourth outer peripheral spline 12a, the fifth outer peripheral spline 31a, and the sixth outer peripheral spline 32a form a first meshing switching mechanism 33, which is a dog clutch, and are aligned in the axial direction, the external diameters of the fifth outer peripheral spline 31a and the sixth outer peripheral spline 32a being equal to each other but smaller than the external diameter of the fourth outer peripheral spline 12a. A sleeve 34 of the first meshing switching mechanism 33 includes a second inner peripheral spline 34a having a large external diameter and a third inner peripheral spline 34b having a small external diameter; the second inner peripheral spline 34a always meshes with the fourth outer peripheral spline 12a, the third inner peripheral spline 34b always meshes with the sixth outer peripheral spline 32a, and the third inner peripheral spline 34b meshes with the fifth outer peripheral spline 31a only when moved to the left as shown in FIG. 7. That is, when the sleeve 34 is moved by a fork 34c to the right from the leftward moved state shown in FIG. 7, meshing between the third inner peripheral spline 34b and the fifth outer peripheral spline 31a is released.

A planetary gear mechanism 35 includes a sun gear 36 as a first element, a carrier 37 as a third element, a ring gear 38 as a second element, and a plurality of pinions 39 relatively rotatably supported on the carrier 37, the pinions 39 meshing with the sun gear 36 and the ring gear 38. The sun gear 36 is joined to the right-hand end of the third output shaft 32, and the ring gear 38 is connected to the right-hand end of the second output shaft 31.

A first inner peripheral spline 41a formed on a sleeve 41 of a second meshing switching mechanism 40, which is a dog clutch, meshes with an outer peripheral spline 37a formed on an outer peripheral part of the carrier 37 and an outer peripheral spline 42a formed on a casing 42. Therefore, when the sleeve 41 is moved leftward by a fork 41b to the position shown in FIG. 7, the carrier 37 is detached from the casing 42, and when the sleeve 41 is moved rightward by the fork 41b from the position shown in FIG. 8, the carrier 37 is joined to the casing 42.

The second power transmission switching mechanism S2 is provided between the transmission shaft 13 and the first output shaft 12 and includes a first outer peripheral spline 13a provided on the transmission shaft 13, a second outer peripheral spline 12b and a third outer peripheral spline 12c provided on the first output shaft 12, a sleeve 43 equipped with an inner peripheral spline 43a, a fork 43b for driving the sleeve 43, and a second one-way clutch 45 disposed between the first output shaft 12 and the second outer peripheral spline 12b.

The sleeve 43 can take a leftward position in which the first outer peripheral spline 13a and the second outer peripheral spline 12b are joined, a middle position in which the first outer peripheral spline 13a, the second outer peripheral spline 12b, and the third outer peripheral spline 12c are joined, and a rightward position in which the second outer peripheral spline 12b and the third outer peripheral spline 12c are joined. Furthermore, the second one-way clutch 45 disposed between the first output shaft 12 and the second outer peripheral spline 12b is engaged when the rotational speed of the first output shaft 12 exceeds the rotational speed of the transmission shaft 13.

A differential case 47 forming an outer shell of the differential gear D is joined to the right-hand end of the second output shaft 31. The differential gear D includes a pair of pinions 49 and 49 rotatably supported on a pinion shaft 48 fixed to the differential case 47, and side gears 50 and 50 fixedly provided on end parts of the axles 10 and 10 and meshing with the pinions 49 and 49.

The operation of the embodiment of the present invention having the above arrangement is now explained.

First, the operation of one transmission unit U of the continuously variable transmission T is explained. When the rotating shaft 14a of the shift actuator 14 is rotated relative to the input shaft 11, the carrier 16 rotates around an axis L1 of the input shaft 11. In this process, a center O of the carrier 16, that is, the center of the equilateral triangle formed by the first pinion 15 and the two second pinions 17 and 17, rotates around the axis L1 of the input shaft 11.

Figure 4:
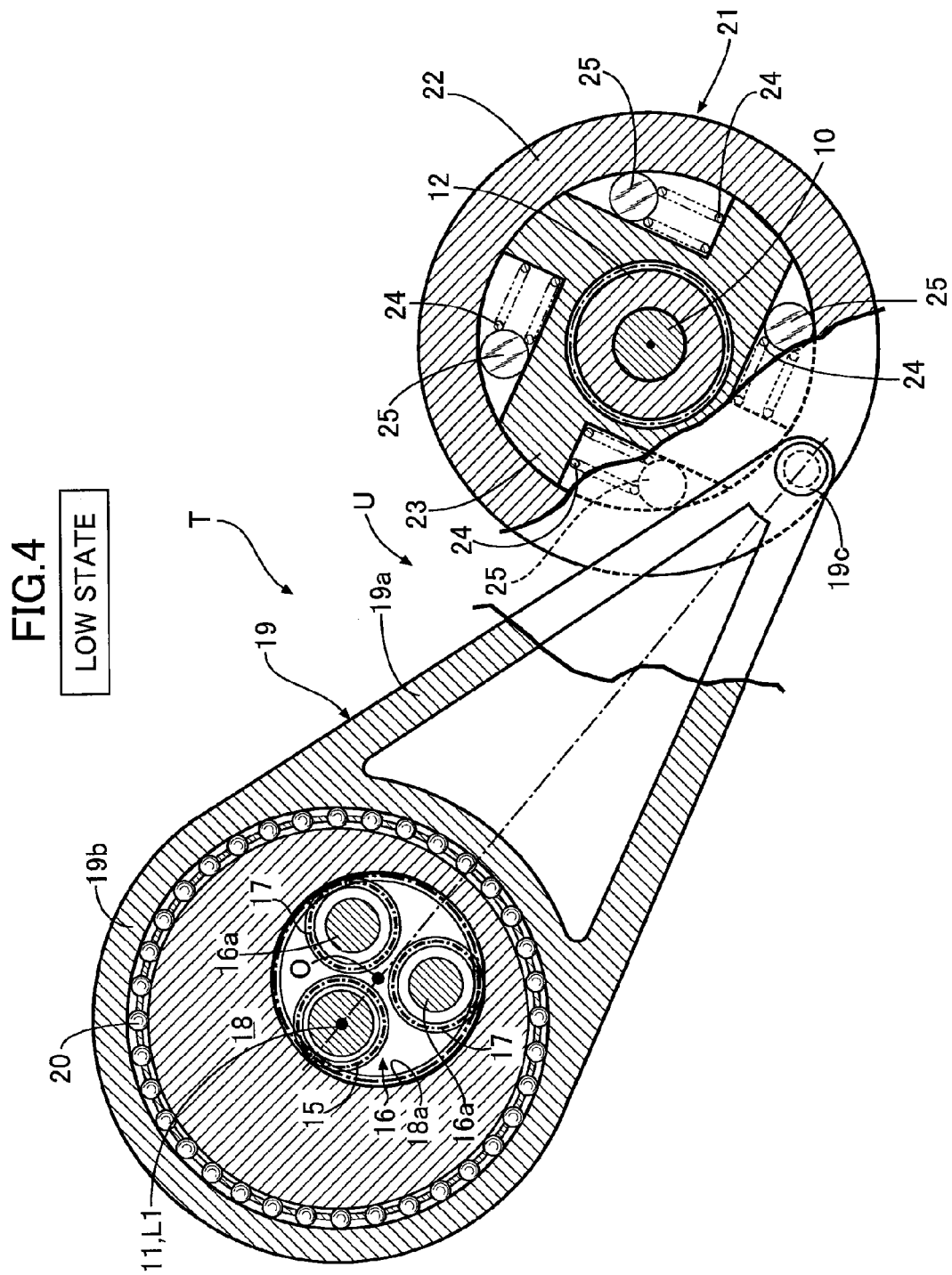
FIG. 4 is a sectional view (LOW state) along line 3-3 in FIG. 2. (first embodiment)
Figure 5:
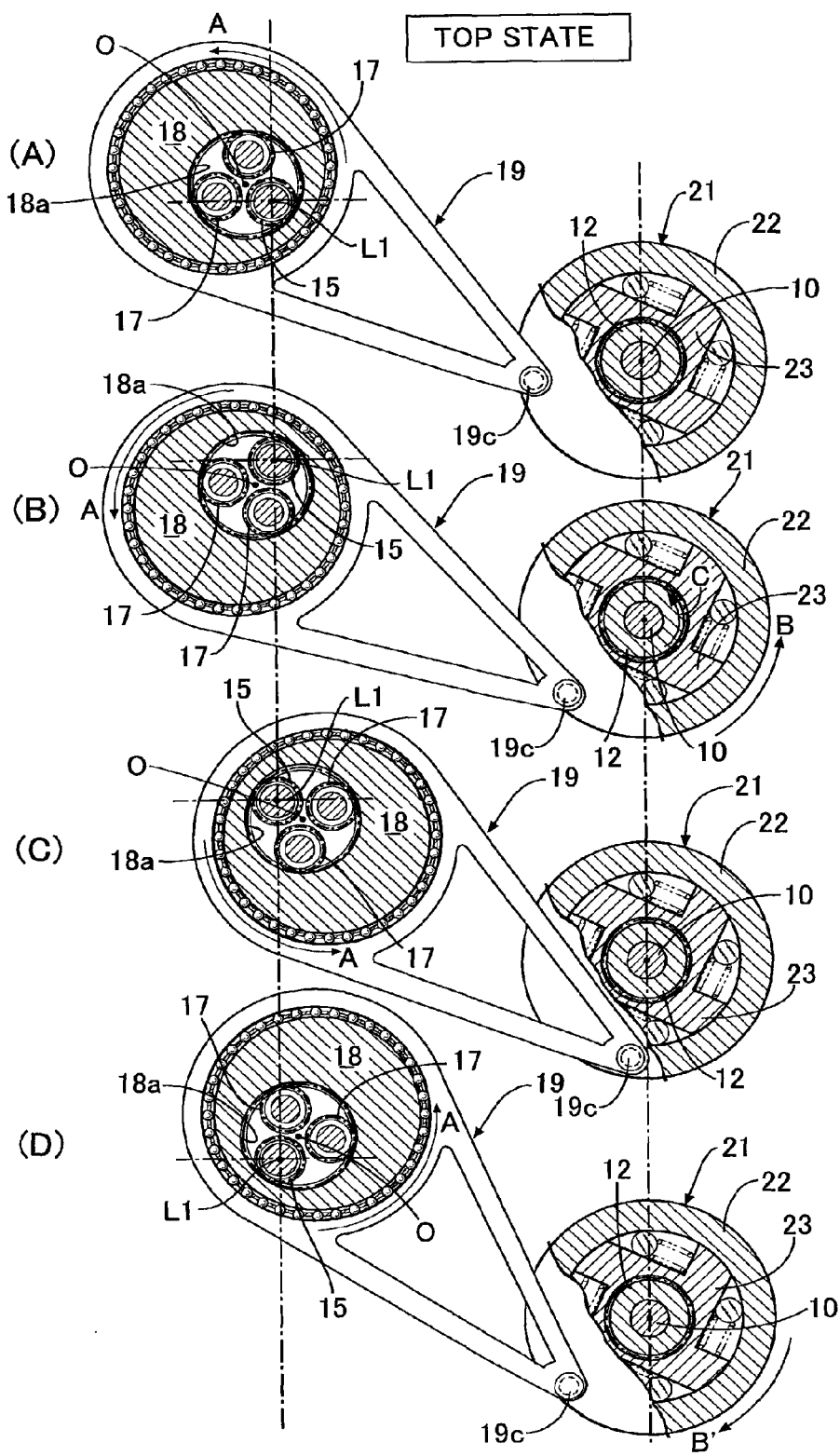
FIG. 5 is a diagram for explaining the operation in the TOP state. (first embodiment)
Figure 6:
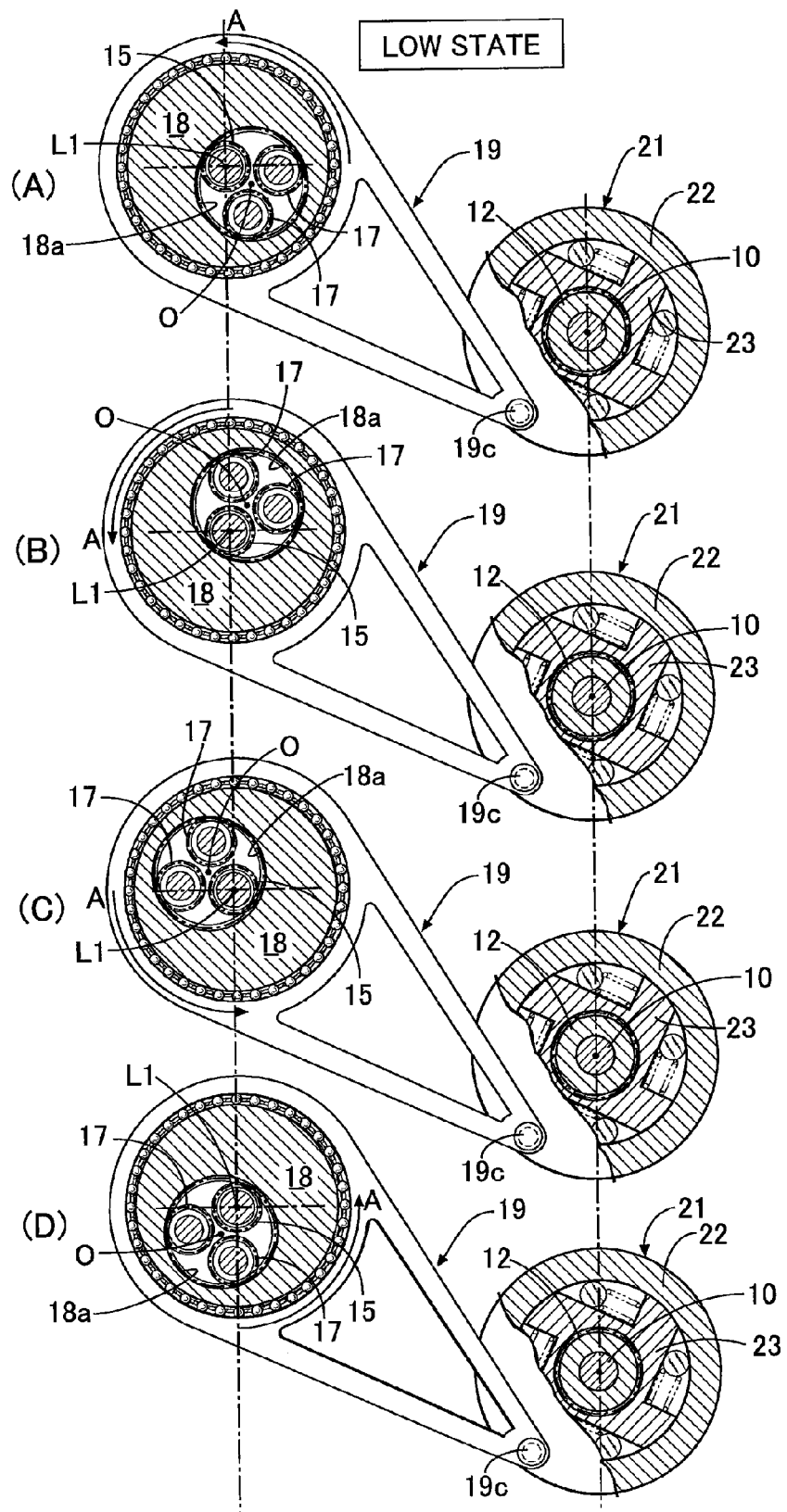
FIG. 6 is a diagram for explaining the operation in the LOW state. (first embodiment)

FIG. 3 and FIG. 5 show a state in which the center O of the carrier 16 is present on the side opposite to the first output shaft 12 with respect to the first pinion 15 (that is, the input shaft 11); here, the amount of eccentricity of the eccentric disk 18 relative to the input shaft 11 becomes a maximum, and the ratio of the continuously variable transmission T attains a TOP state. FIG. 4 and FIG. 6 show a state in which the center O of the carrier 16 is present on the same side as the first output shaft 12 with respect to the first pinion 15 (that is, the input shaft 11); here, the amount of eccentricity of the eccentric disk 18 relative to the input shaft 11 becomes a minimum, and the ratio of the continuously variable transmission T attains a LOW state.

When in the TOP state shown in FIG. 5 the input shaft 11 is rotated by the engine E and the rotating shaft 14a of the shift actuator 14 is rotated at the same speed as that of the input shaft 11; in a state in which the input shaft 11, the rotating shaft 14a, the carrier 16, the first pinion 15, the two second pinions 17 and 17, and the eccentric disk 18 are integrated, they rotate eccentrically in the counterclockwise direction (see arrow A) with the input shaft 11 as the center. While rotating from FIG. 5 (A) to FIG. 5 (B) and then to the state of FIG. 5 (C), the connecting rod 19, which has the ring portion 19b relatively rotatably supported on the outer periphery of the eccentric disk 18 via the ball bearing 20, rotates the outer member 22, which is pivotably supported at the extremity of the rod portion 19a by means of the pin 19c, in the counterclockwise direction (see arrow B). FIG. 5 (A) and FIG. 5 (C) denote opposite ends of rotation in the arrow B direction of the outer member 22.

When the outer member 22 rotates in the arrow B direction in this way, the rollers 25 bite into the wedge-shaped space between the outer member 22 and the inner member 23 of the first one-way clutch 21, rotation of the outer member 22 is transmitted to the first output shaft 12 via the inner member 23, and the first output shaft 12 therefore rotates in the counterclockwise direction (see arrow C).

When the input shaft 11 and the first pinion 15 rotate further, the eccentric disk 18 having the ring gear 18a meshing with the first pinion 15 and the second pinions 17 and 17 rotates eccentrically in the counterclockwise direction (see arrow A). While rotating from FIG. 5 (C) to FIG. 5 (D) and then to the state of FIG. 5 (A), the connecting rod 19 having the ring portion 19b relatively rotatably supported on the outer periphery of the eccentric disk 18 via the ball bearing 20 rotates the outer member 22, which is pivotably supported at the extremity of the rod portion 19a by means of the pin 19c, in the clockwise direction (see arrow B'). FIG. 5 (C) and FIG. 5 (A) denote opposite ends of rotation in the arrow B' direction of the outer member 22.

When the outer member 22 rotates in the arrow B' direction in this way, the rollers 25 are pushed out from the wedge-shaped space between the outer member 22 and the inner member 23 while compressing the springs 24, the outer member 22 slips against the inner member 23, and the first output shaft 12 does not rotate.

As hereinbefore described, when the outer member 22 rotates back and forth, since the first output shaft 12 rotates in the counterclockwise direction (see arrow C) only when the direction of rotation of the outer member 22 is counterclockwise (see arrow B), the first output shaft 12 rotates intermittently.

FIG. 6 shows the operation when the continuously variable transmission T is run in the LOW state. In this process, since the position of the input shaft 11 coincides with the center of the eccentric disk 18, the amount of eccentricity of the eccentric disk 18 relative to the input shaft 11 becomes zero. When in this state the input shaft 11 is rotated by the engine E and the rotating shaft 14a of the shift actuator 14 is rotated at the same speed as that of the input shaft 11; in a state in which the input shaft 11, the rotating shaft 14a, the carrier 16, the first pinion 15, the two second pinions 17 and 17, and the eccentric disk 18 are integrated, they rotate eccentrically in the counterclockwise direction (see arrow A) with the input shaft 11 as the center. However, since the amount of eccentricity of the eccentric disk 18 is zero, the stroke of back and forth movement of the connecting rod 19 also becomes zero, and the first output shaft 12 does not rotate.

Therefore, setting the position of the carrier 16 between the TOP state of FIG. 3 and the LOW state of FIG. 4 by driving the shift actuator 14 enables running to be carried out at any ratio between a ratio of zero and a predetermined ratio.

Since, with regard to the continuously variable transmission T, the phases of the eccentric disks 18 of the four transmission units U disposed side by side are displaced from each other by 90°, transmitting the driving force in turn from the four transmission units U, that is, putting at least one of the four first one-way clutches 21 in an engaged state at any one time, enables the first output shaft 12 to be rotated continuously.

The operation of the first power transmission switching mechanism S1, which switches between the parking range, the reverse range, the neutral range, and the drive range, is now explained.

Figure 9:
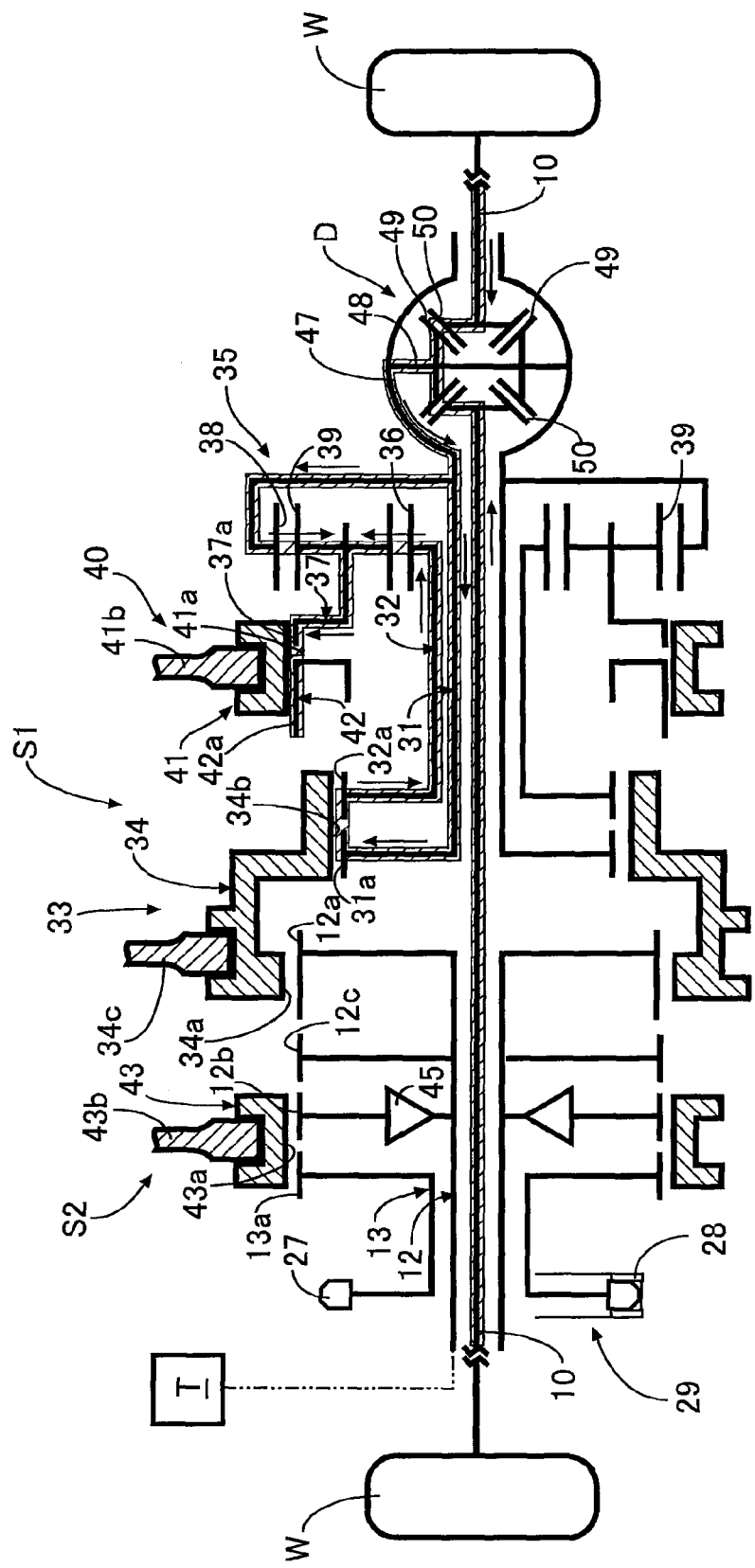
FIG. 9 is a torque flow diagram in a parking range. (first embodiment)

As shown in FIG. 8 and FIG. 9, when the sleeve 34 of the first meshing switching mechanism 33 is moved to the left to thus join the first output shaft 12, the second output shaft 31, and the third output shaft 32 as a unit, and the sleeve 41 of the second meshing switching mechanism 40 is moved to the right to thus join the carrier 37 of the planetary gear mechanism 35 to the casing 42, the parking range is established.

In the parking range, the second output shaft 31, which is integral with the differential case 47, is joined to the ring gear 38 of the planetary gear mechanism 35, the second output shaft 31 is connected to the sun gear 36 of the planetary gear mechanism 35 via the first meshing switching mechanism 33 and the third output shaft 32 and, furthermore, the carrier 37 of the planetary gear mechanism 35 is joined to the casing 42 via the second meshing switching mechanism 40. As a result, the planetary gear mechanism 35 attains a locked state, and the driven wheels W and W connected thereto via the differential gear D are non-rotatably restrained.

Figure 10:
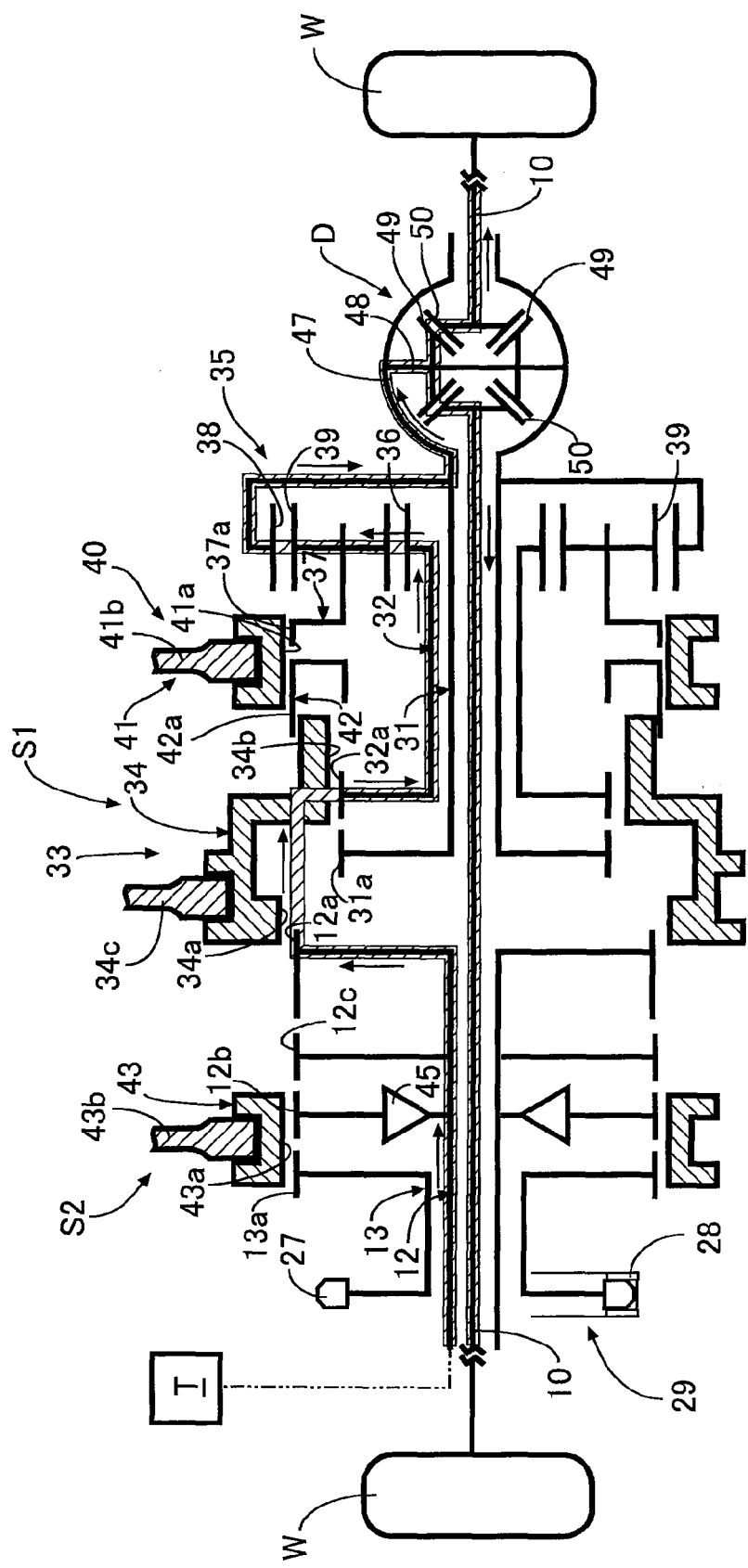
FIG. 10 is a torque flow diagram in a reverse range. (first embodiment)

As shown in FIG. 8 and FIG. 10, when the sleeve 34 of the first meshing switching mechanism 33 is moved to the right to thus join the first output shaft 12 and the third output shaft 32 and detach the second output shaft 31, and the sleeve 41 of the second meshing switching mechanism 40 is moved to the right to thus join the carrier 37 of the planetary gear mechanism 35 to the casing 42, the reverse range is established.

In the reverse range, the driving force outputted from the continuously variable transmission T to the first output shaft 12 is transmitted to the differential case 47 via the path: first meshing switching mechanism 33→third output shaft 32→sun gear 36→carrier 37→ring gear 38, and at the same time it is reduced in speed and reversed in rotation in the planetary gear mechanism 35, thus enabling the vehicle to be made to travel in reverse.

Figure 11:
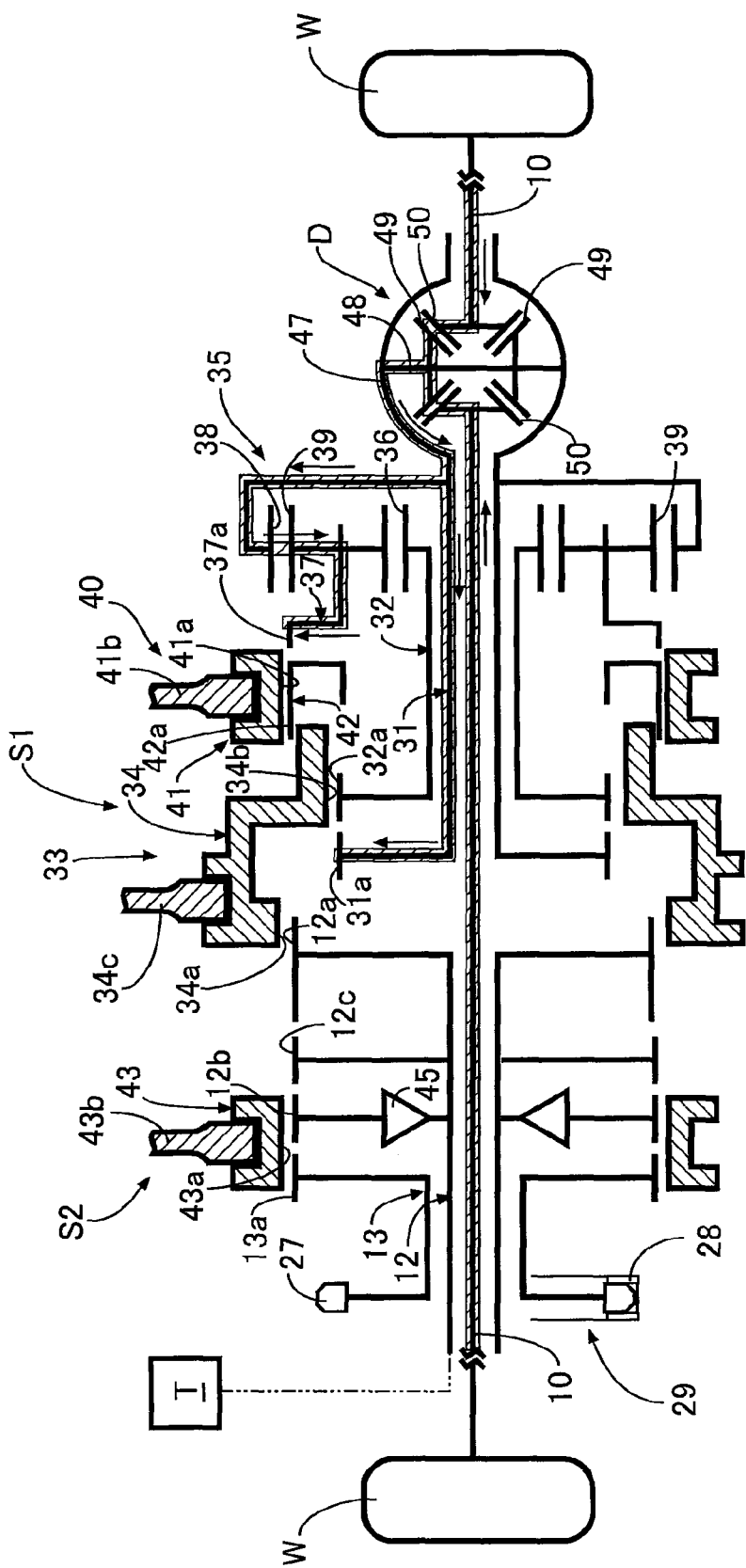
FIG. 11 is a torque flow diagram in a neutral range. (first embodiment)

As shown in FIG. 8 and FIG. 11, when the sleeve 34 of the first meshing switching mechanism 33 is moved to the right to thus join the first output shaft 12 and the third output shaft 32 and detach the second output shaft 31, and the sleeve 41 of the second meshing switching mechanism 40 is moved to the left to thus detach the carrier 37 of the planetary gear mechanism 35 from the casing 42, the neutral range is established.

In the neutral range, since the carrier 37 of the planetary gear mechanism 35 is detached from the casing 42, the ring gear 38 can rotate freely, and since the second output shaft 31 can rotate freely, the differential case 47 can rotate freely, the driven wheels W and W thereby attaining a non-restrained state. In this state, the driving force of the engine E is transmitted from the continuously variable transmission T to the sun gear 36 via the path: first output shaft 12→first meshing switching mechanism 33→third output shaft 32, but since the carrier 37 is not restrained, the planetary gear mechanism 35 idles, and the driving force is not transmitted to the differential gear D.

Figure 12:
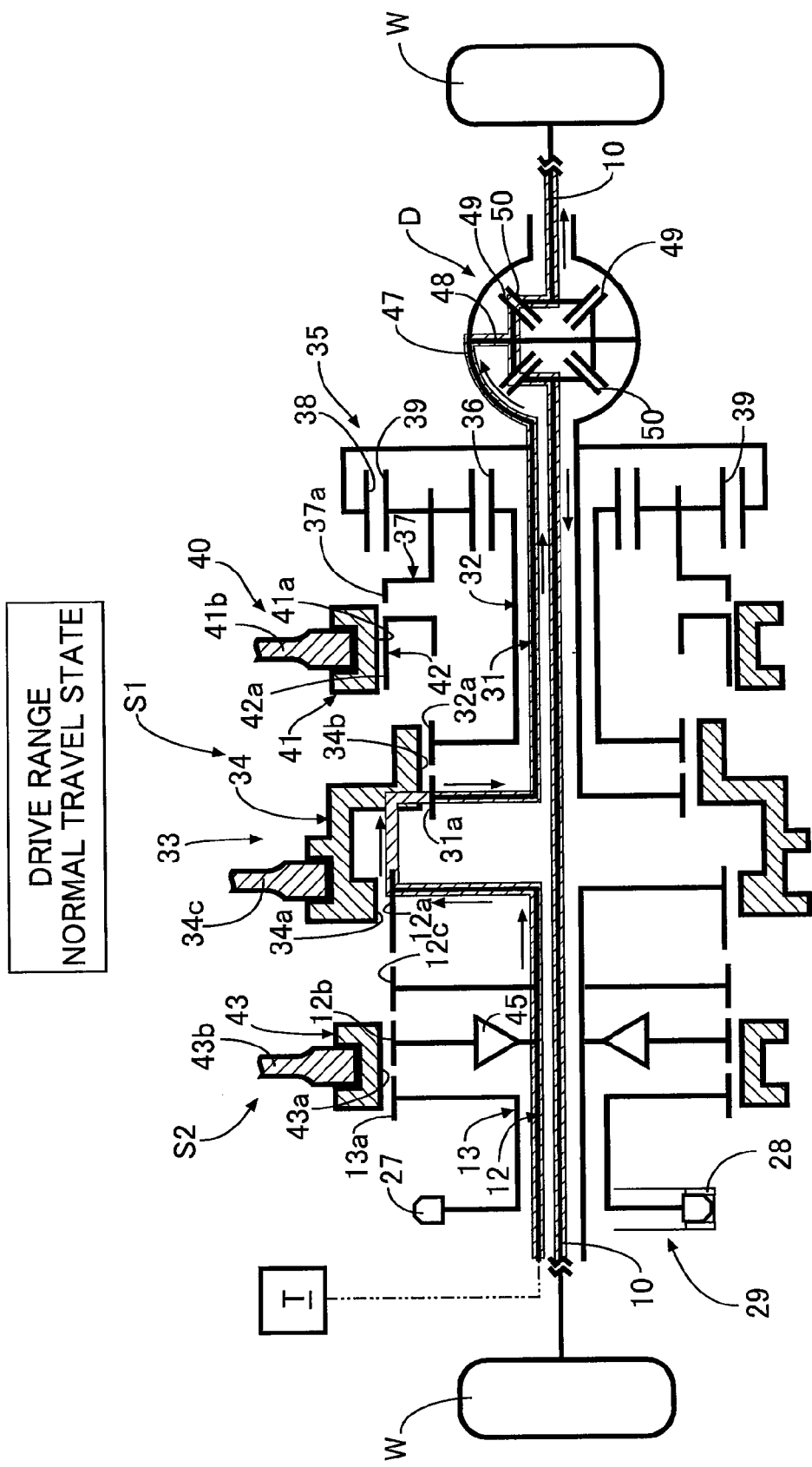
FIG. 12 is a torque flow diagram in a drive range (normal travel state). (first embodiment)

As shown in FIG. 9 and FIG. 12, when the sleeve 34 of the first meshing switching mechanism 33 is moved to the left to thus integrally join the first output shaft 12, the second output shaft 31, and the third output shaft 32, and the sleeve 41 of the second meshing switching mechanism 40 is moved to the left to thus detach the carrier 37 of the planetary gear mechanism 35 from the casing 42, the drive range is established.

In the drive range, since the ring gear 38 and the sun gear 36 of the planetary gear mechanism 35 are joined to each other by means of the first meshing switching mechanism 33, the planetary gear mechanism 35 attains a state in which it can rotate as a unit. As a result, the driving force outputted from the continuously variable transmission T to the first output shaft 12 is transmitted to the differential case 47 via the path: first meshing switching mechanism 33→second output shaft 31 or via the path: first meshing switching mechanism 33→third output shaft 32→sun gear 36→carrier 37→ring gear 38, thus enabling the vehicle to be made to travel forward.

As hereinbefore described, since the driving force is transmitted via the first one-way clutches 21, the first output shaft 12 of the continuously variable transmission T of the present embodiment can rotate only in the direction of forward travel, but disposing the first power transmission switching mechanism S1 having a forward-reverse switching function on the downstream side of the first output shaft 12 enables the vehicle to be made to travel in reverse without hybridization, in which an electric motor is provided for reverse travel.

Moreover, since the first power transmission switching mechanism S1 can establish the parking range and the neutral range in addition to the drive range and the reverse range, it is possible to further reduce the size and lighten the weight of the power transmission device itself.

The operation of the second power transmission switching mechanism S2 for switching between a normal travel/engine braking state, an idling stop state, and a fail state is now explained.

As shown in FIG. 10 and FIG. 12, in a normal state in which the first power transmission switching mechanism S1 is in any of the parking range, the reverse range, the neutral range, and the drive range, which are described above, the sleeve 41 of the second power transmission switching mechanism S2 moves leftward thus providing a connection between the first outer peripheral spline 13a of the transmission shaft 13 and the second outer peripheral spline 12b of the first output shaft 12. Therefore, when the vehicle is traveling in the drive range or the reverse range, the driving force of the engine E is not only transmitted from the input shaft 11 to the first output shaft 12 via the transmission units U, but also transmitted from the input shaft 11 to the transmission shaft 13 via the auxiliary power transmission means 29 formed from the first sprocket 26, the endless chain 28, and the second sprocket 27, and transmitted from the first outer peripheral spline 13a of the transmission shaft 13 to the second outer peripheral spline 12b of the first output shaft 12.

However, since the gear ratio of the transmission units U is set so as to be larger than the gear ratio of the auxiliary power transmission means 29, the rotational speed of the transmission shaft 13 (that is, the rotational speed of the second outer peripheral spline 12b) becomes larger than the rotational speed of the first output shaft 12, the second one-way clutch 45 is disengaged, power transmission via the auxiliary power transmission means 29 is not carried out, and the vehicle is made to travel forward or in reverse by means of power transmission via the transmission units U.

Figure 13:
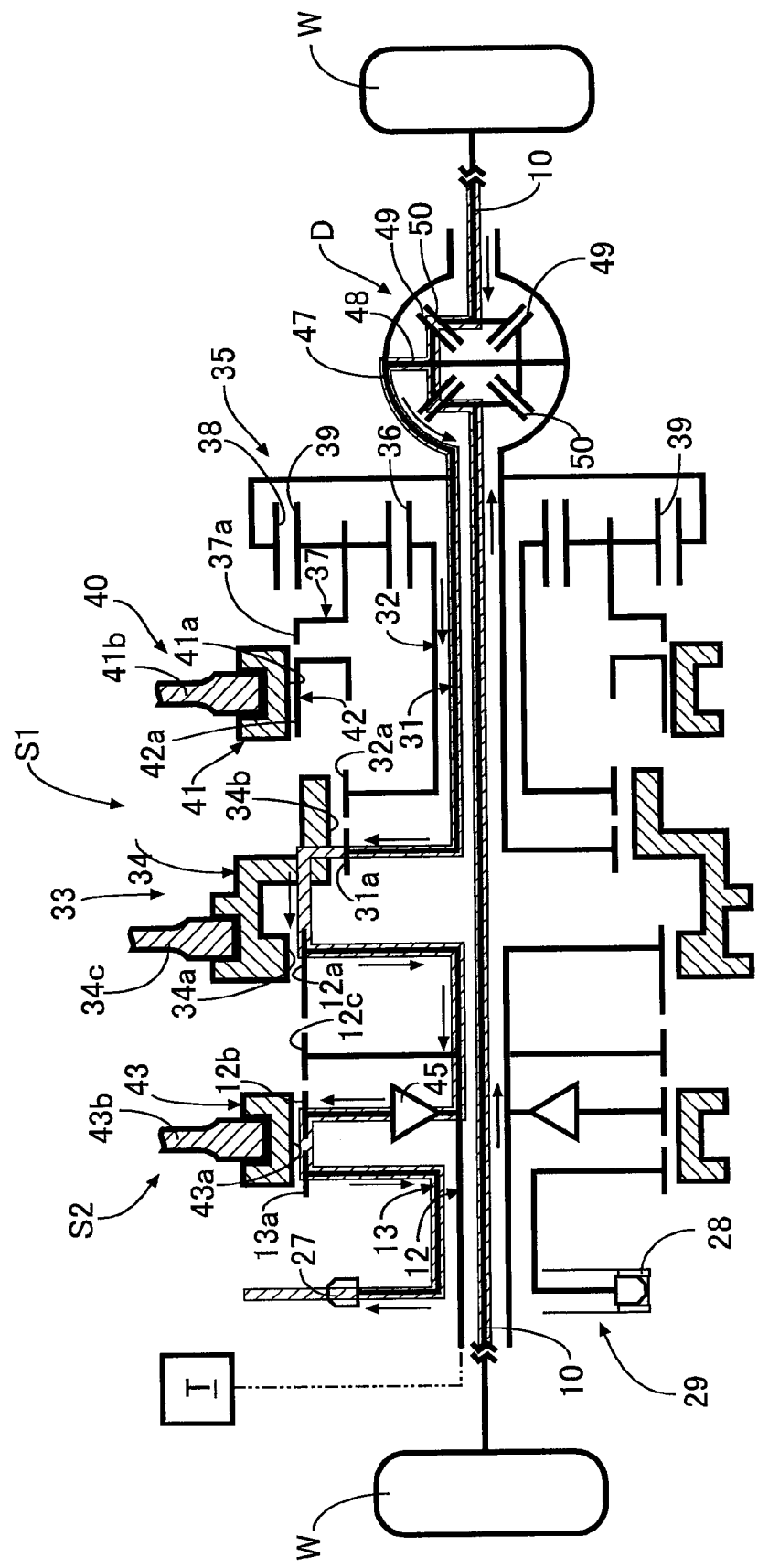
FIG. 13 is a torque flow diagram in a drive range (engine braking state). (first embodiment)

When the vehicle is shifted to a deceleration state while it is traveling forward in the drive range, as shown in FIG. 13, the engine rotational speed decreases and the first one-way clutches 21 of the transmission units U are disengaged, and the driving force from the driven wheels W and W is transmitted to the first output shaft 12 via the differential gear D and the first power transmission switching mechanism S1. In this process, the rotational speed of the first output shaft 12 becomes larger than the rotational speed of the transmission shaft 13 connected to the input shaft 11 via the auxiliary power transmission mechanism 29 (that is, the rotational speed of second outer peripheral spline 12b), the second one-way clutch 45 is engaged, and the driving force of the first output shaft 12 is thereby transmitted back to the engine E via the auxiliary power transmission means 29 and the input shaft 11, thus effecting engine braking.

Even when the vehicle decelerates while it is traveling in reverse in the reverse range, since the first output shaft 12 rotates in the same direction as with forward travel in the drive range, engine braking can be effected in the same manner.

Figure 14:
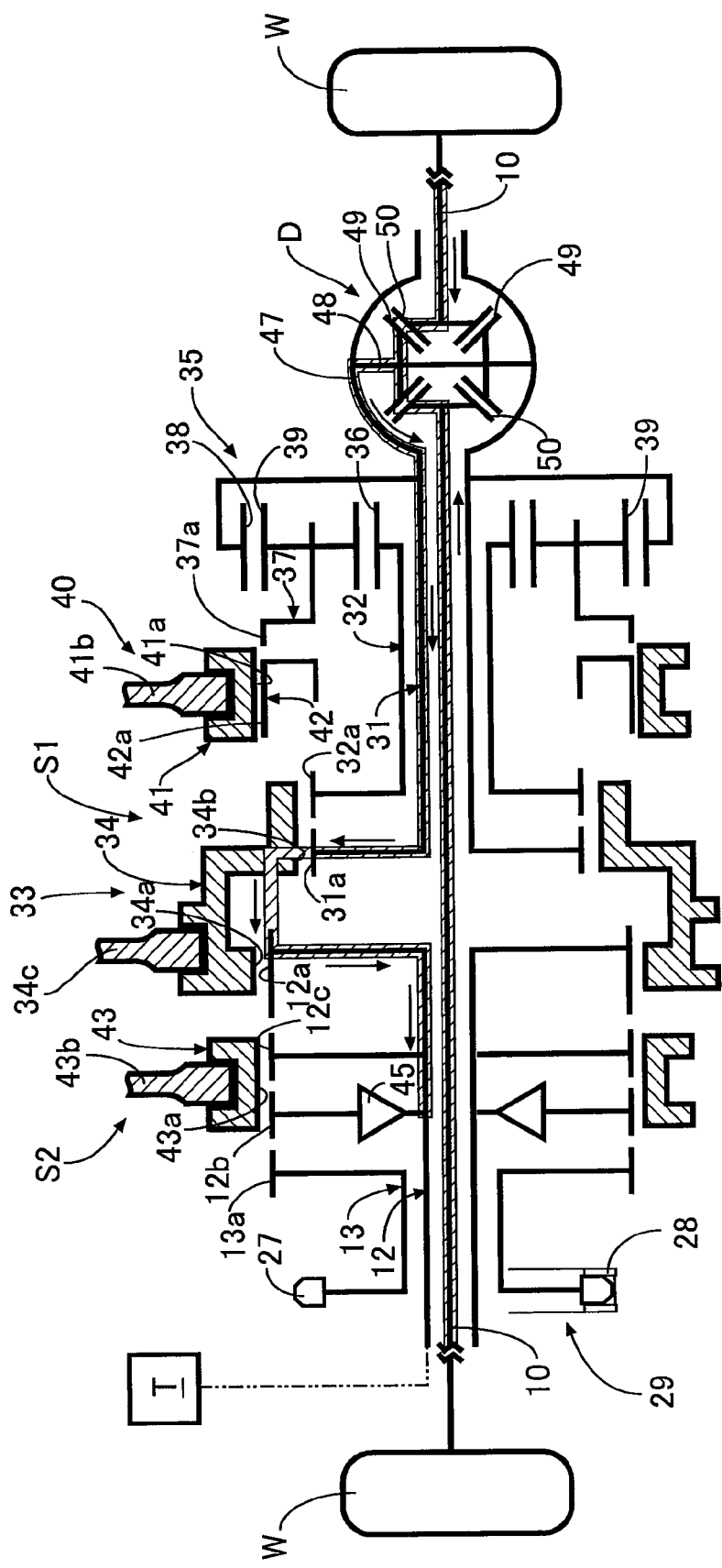
FIG. 14 is a torque flow diagram in a drive range (idling stop state). (first embodiment)

When the vehicle decelerates further while it is traveling in the drive range, as shown in FIG. 14, the second outer peripheral spline 12b and the third outer peripheral spline 12c of the first output shaft 12 are joined by moving the sleeve 41 of the second power transmission switching mechanism S2 rightward. As a result, the first output shaft 12, which is rotated by means of the driving force transmitted back from the driven wheels W and W, is detached from the transmission shaft 13 (that is, from the engine E), idling stop while decelerating is therefore enabled, and the fuel consumption can be reduced.

Figure 15:
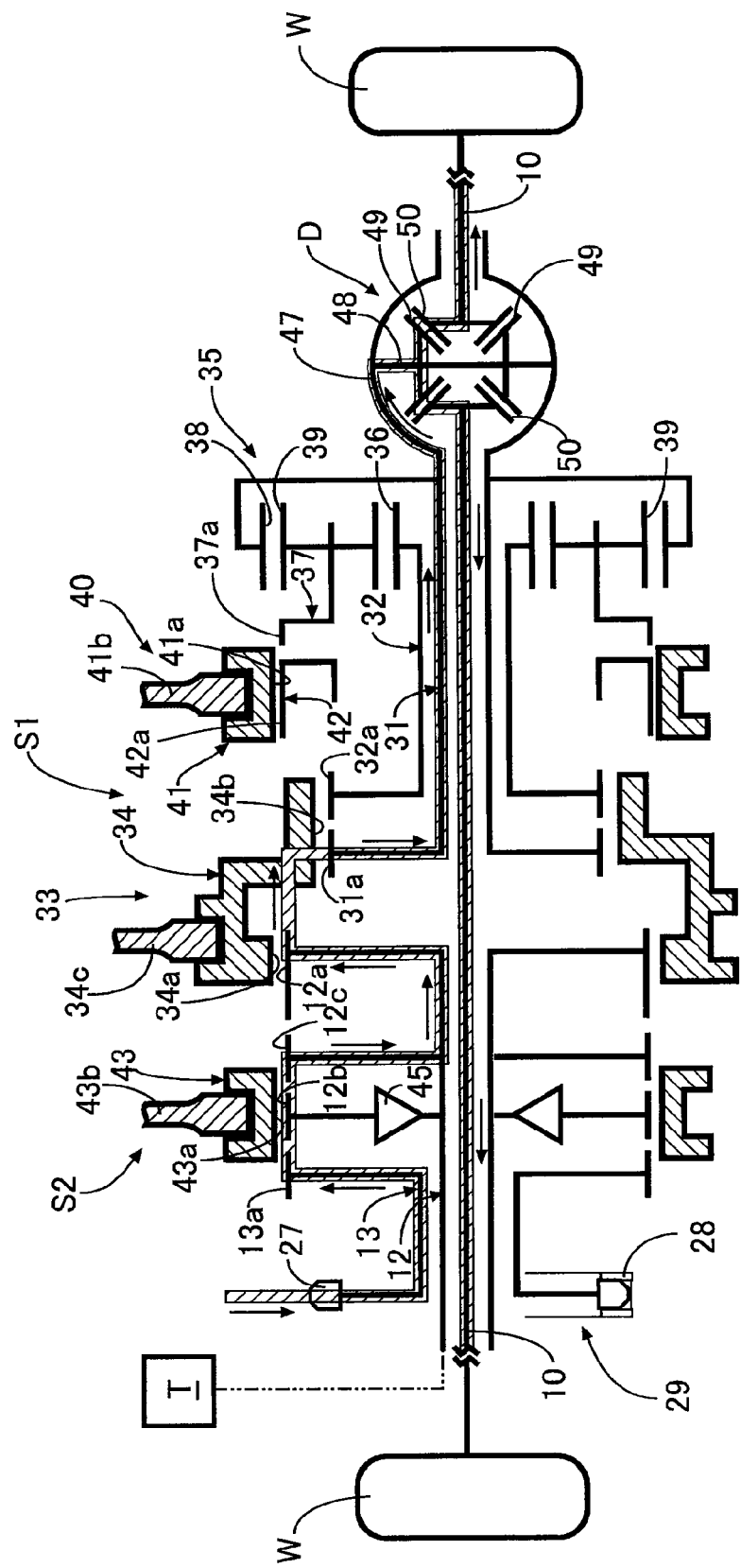
FIG. 15 is a torque flow diagram in a drive range (fail state). (first embodiment)

When there is a failure of the transmission units U and the vehicle is unable to travel, as shown in FIG. 15, the sleeve 41 of the second power transmission switching mechanism S2 is put into the middle position, and the first outer peripheral spline 13a of the transmission shaft 13 and the second outer peripheral spline 12b and the third outer peripheral spline 12c of the first output shaft 12 are joined. As a result, the transmission shaft 13 and the first output shaft 12 are directly joined without going through the second one-way clutch 45, the driving force of the engine E is therefore transmitted from the input shaft 11 to the driven wheels W and W via the auxiliary power transmission means 29, the transmission shaft 13, the first output shaft 12, the first power transmission switching mechanism S1, and the differential gear D, and the vehicle can be made to travel forward or in reverse to a repair shop.

As hereinbefore described, in accordance with the present embodiment, engine braking is enabled both when traveling forward and when traveling in reverse while enabling the vehicle to travel forward and in reverse without using an electric motor, which would increase the axial dimension of the vehicle power transmission device and, moreover, idling stop while the vehicle is decelerating and traveling when there is a failure of the transmission units U are enabled. Furthermore, the vehicle power transmission device tends to increase the axial dimension on the input shaft 11 side, to which the engine E is connected, but providing the transmission shaft 13 on the first output shaft 12 side enables any increase in the axial dimension on the input shaft 11 side to be suppressed, thus minimizing the overall axial dimension of the vehicle power transmission device.

Figure 16:
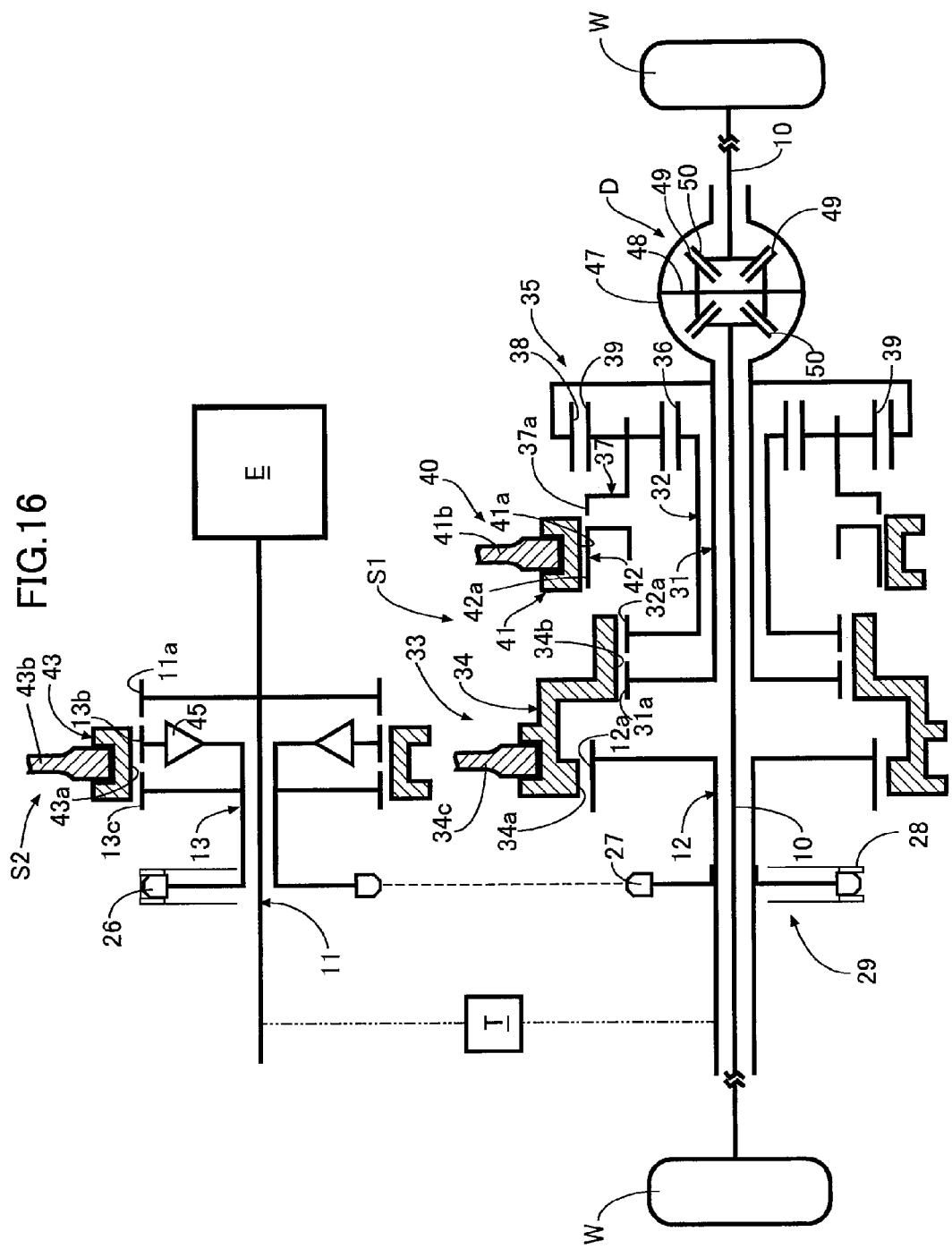
FIG. 16 is a diagram corresponding to FIG. 7. (second embodiment)

A second embodiment of the present invention is now explained by reference to FIG. 16.

Second Embodiment

In the first embodiment described above, the transmission shaft 13 and the second power transmission switching mechanism S2 are provided on the first output shaft 12, but in a second embodiment a transmission shaft 13 and a second power transmission switching mechanism S2 are provided on an input shaft 11.

That is, a first outer peripheral spline 11a is provided on the input shaft 11 of the second embodiment, and a second outer peripheral spline 13b, a third outer peripheral spline 13c, and a first sprocket 26 are provided on the transmission shaft 13. Furthermore, a second one-way clutch 45 is provided between the transmission shaft 13 and a second outer peripheral spline 13b, and the second one-way clutch 45 is engaged when the rotational speed of the transmission shaft 13 exceeds the rotational speed of the second outer peripheral spline 13b.

When a sleeve 43 of the second power transmission switching mechanism S2 is moved rightward, the first outer peripheral spline 11a of the input shaft 11 and the second outer peripheral spline 13b of the transmission shaft 13 are joined, when the sleeve 43 of the second power transmission switching mechanism S2 is put in a middle position, the first outer peripheral spline 11a of the input shaft 11 and the second outer peripheral spline 13b and the third outer peripheral spline 13c of the transmission shaft 13 are joined, and when the sleeve 43 of the second power transmission switching mechanism S2 is moved leftward, the second and third outer peripheral splines 13b and 13c of the transmission shaft 13 are joined.

The operation of the second embodiment is substantially the same as the operation of the first embodiment, which is described above. That is, when the sleeve 43 of the second power transmission switching mechanism S2 is moved rightward to thus join the first outer peripheral spline 11a of the input shaft 11 and the second outer peripheral spline 13b of the transmission shaft 13, the driving force can be transmitted from driven wheels W and W back to an engine E via auxiliary power transmission means 29 when the vehicle is decelerating while traveling forward or in reverse, thus effecting engine braking. Furthermore, when the sleeve 43 of the second power transmission switching mechanism S2 is moved leftward to thus join the second and third outer peripheral splines 13b and 13c of the transmission shaft 13, the transmission shaft 13 can be detached from the input shaft 11, thus enabling the engine E to undergo idling stop when the vehicle is decelerating while traveling forward or in reverse. Moreover, when the sleeve 43 of the second power transmission switching mechanism S2 is put into the middle position to thus join the first outer peripheral spline 11a of the input shaft 11 and the second and third outer peripheral splines 13b and 13c of the transmission shaft 13, the driving force of the engine E can be transmitted to the first output shaft 12 via the auxiliary power transmission means 29 when there is a failure of the units U, thus enabling the vehicle to travel forward or in reverse.

In the second embodiment, since the transmission shaft 13 is provided on the input shaft 11 side, which tends to increase in the axial dimension due to the engine E being connected, this is disadvantageous in terms of reduction in the overall axial dimension of the power transmission device compared with the layout of the first embodiment.

Embodiments of the present invention are explained above, but the present invention may be modified in a variety of ways as long as the modifications do not depart from the spirit and scope thereof.

For example, the number of transmission units U is not limited to four as in the embodiment.

The invention claimed is:

1. A vehicle power transmission device comprising:
   an input shaft connected to an engine,
   an output shaft connected to a driven wheel,
   an input side fulcrum having a variable amount of eccentricity from an axis of the input shaft and rotating together with the input shaft,
   a first one-way clutch connected to the output shaft,
   an output side fulcrum provided on an input member of the first one-way clutch,
   a connecting rod having opposite ends thereof connected to the input side fulcrum and the output side fulcrum and moving back and forth, and
   a shift actuator for changing the amount of eccentricity of the input side fulcrum,
   wherein the vehicle power transmission device comprises:
   a forward/reverse switching mechanism disposed between the output shaft and the driven wheel,
   a transmission shaft relatively rotatably fitted around an outer periphery of the output shaft,
   an auxiliary power transmission device configured to provide a connection between the input shaft and the transmission shaft,
   a first outer peripheral spline provided on the transmission shaft,
   a second outer peripheral spline and a third outer peripheral spline provided on the output shaft,
   an inner peripheral spline that can switch between a first state in which the inner peripheral spline meshes with the first and second outer peripheral splines, a second state in which the inner peripheral spline meshes with the second and third outer peripheral splines, and a third state in which the inner peripheral spline meshes with the first to third outer peripheral splines, and
   a second one-way clutch that is provided between the output shaft and the second outer peripheral spline and that is engaged when a rotational speed of the output shaft exceeds a rotational speed of the second outer peripheral spline.

2. The vehicle power transmission device according to claim 1, wherein the input shaft side of the auxiliary power transmission device is disposed further on the engine side than the input side fulcrum and the transmission shaft side is disposed further on the forward/reverse switching mechanism side than the output side fulcrum.

3. A vehicle power transmission device comprising:
an input shaft connected to an engine,
an output shaft connected to a driven wheel,
an input side fulcrum having a variable amount of eccentricity from an axis of the input shaft and rotating together with the input shaft,
a first one-way clutch connected to the output shaft,
an output side fulcrum provided on an input member of the first one-way clutch,
a connecting rod having opposite ends thereof connected to the input side fulcrum and the output side fulcrum and moving back and forth, and
a shift actuator for changing the amount of eccentricity of the input side fulcrum, wherein
the vehicle power transmission device comprises:
a forward/reverse switching mechanism disposed between the output shaft and the driven wheel,
a transmission shaft relatively rotatably fitted around an outer periphery of the input shaft,
an auxiliary power transmission device configured to provide a connection between the transmission shaft and the output shaft,
a first outer peripheral spline provided on the input shaft,
a second outer peripheral spline and a third outer peripheral spline provided on the transmission shaft,
an inner peripheral spline that can switch between a first state in which the inner peripheral spline meshes with the first and second outer peripheral splines, a second state in which the inner peripheral spline meshes with the second and third outer peripheral splines, and a third state in which the inner peripheral spline meshes with the first to third outer peripheral splines, and
a second one-way clutch that is provided between the transmission shaft and the second outer peripheral spline and that is engaged when a rotational speed of the transmission shaft exceeds a rotational speed of the second outer peripheral spline.

4. The vehicle power transmission device according to claim 3, wherein the transmission shaft side of the auxiliary power transmission device is disposed further on the engine side than the input side fulcrum and the output shaft side is disposed further on the forward/reverse switching mechanism side than the output side fulcrum.

* * * * *